United States Patent [19]

McAllister et al.

[11] Patent Number: 4,999,724

[45] Date of Patent: Mar. 12, 1991

[54] DISK DRIVE HAVING AN ELECTRICALLY ISOLATED DISK STACK

[75] Inventors: Jeffrey S. McAllister, Boise; Steven M. Johnson, Eagle, bothof, Id.

[73] Assignee: Hewlett-Packard Company, Palo Alto, Calif.

[21] Appl. No.: 434,656

[22] Filed: Nov. 13, 1989

[51] Int. Cl.$^5$ .................... G11B 17/02; G11B 33/14; G11B 17/08

[52] U.S. Cl. .................. 360/98.08; 360/97.03; 360/98.01

[58] Field of Search ............... 360/97.02, 97.03, 98.01, 360/98.08

[56] References Cited

U.S. PATENT DOCUMENTS

| | | | |
|---|---|---|---|
| 4,038,693 | 7/1977 | Huffine et al. | 360/99.05 |
| 4,701,653 | 10/1987 | Merkle et al. | 360/99.08 |
| 4,800,454 | 1/1989 | Schwarz et al. | 360/103 |

FOREIGN PATENT DOCUMENTS

| | | | |
|---|---|---|---|
| 61-80656 | 4/1986 | Japan | 360/98.08 |
| 2166586 | 5/1986 | United Kingdom | 360/98.08 |

Primary Examiner—A. J. Heinz
Assistant Examiner—Jefferson Evans
Attorney, Agent, or Firm—E. F. Oberheim

[57] ABSTRACT

A disk drive in which the rotatable magnetic memory disks and the metal actuator are electrically isolated from the metallic mainframe of the disk drive and the magnetic heads on the metallic actuator, the coils of the magnetic heads and the magnetic memory disks are maintained at electrical potential levels which are sufficiently close to prevent arcing therebetween and which is different from the potential of the main frame. Electrical isolation is achieved by electrically insulating the disk spindle on which the disks are journaled from the mainframe and by electrically insulating the metal actuator from the metal actuator support when the metal actuator support is attached directly to the main frame, or by electrically insulating the metal actuator support from the main frame. An electrical potential is applied to the disks via the disk spindle and to the body of the magnetic heads via the metal actuator arm to provide potential levels which among these parts are sufficiently close to prevent arcing.

16 Claims, 3 Drawing Sheets

DISK DRIVE HAVING AN ELECTRICALLY ISOLATED DISK STACK

FIELD OF THE INVENTION

1. Field of the Invention

This invention relates generally to magnetic disk memory drives in which the magnetic heads and the magnetic memory disks are maintained at electrical potential levels which are substantially the same as the coil potential of the magnetic heads, or which are sufficiently close to prevent arcing, and more particularly to arrangements in such disk drives for electrically isolating the actuators, the magnetic heads and the magnetic memory disks from the metallic main frame.

2. Background of the Invention

The reduction in size of disk drives together with requirements for increases in data storage have resulted in such close head/disk spacing as the head flies on the thin film of air clinging to the rotating disk, that head/-disk arcing occurs at existing head electrical potentials, which is destructive.

Magnetic heads have a magnetic core and a coil which are magnetically coupled. The coil is electrically insulated from the core. The coil is connected to a DC biased amplifier which functions as the first stage in a signal processing circuit for the coil. Because of the construction of the magnetic head, a parasitic capacitance exists which becomes charged. During operatioh, as in a read operation of the disk drive, the parasitic capacitance may discharge into the disk and a read error occurs. A copending application of Samuel H. Gailbreath, et al, Ser. No. 07/311,486, filed 02/15/89, entitled METHOD AND APPARATUS FOR PREVENTING PARASITIC ELECTRICAL DISCHARGES IN MAGNETIC DISK DRIVES, and assigned to the assignee of this invention, discusses the electrical aspects of this problem and its solution, by maintaining the magnetic head and the adjacent disk electrical potential levels which, at least, are sufficiently close to prevent arcing.

One approach to achieving similar potentials on the head and disks is to reduce the voltage applied to the magnetic head toward ground. The mainframe of the disk drive being metallic is ordinarily at ground potential in disk drive installations. This approach, however, is not entirely satisfactory because of the DC voltage biasing level required for normal and acceptable amplifier operation.

Another approach which has proven to be acceptable is to electrically float or isolate the entire disk drive at installation, it being mounted on flexible dampers for vibration and mechanical shock isolation which, as constructed, also function as electrical isolators. As in the referenced application, the head and the disk are then brought to the biasing potential of the amplifier.

Still another approach ahs included the application of a coating to the mainframe of an epoxy paint, particularly in the region in which the support, such as a spindle, which roatably mounts the disks, or the metallic actuator, is secured to the metallic mainframe of the disk drive. Although effective in some instances, the failure rate of the epoxy paint permitting contact between the support and the metallic mainframe was not acceptable. Repair after such failures was extremely costly.

Of the approaches discussed above, electrical floating of the mainframe is more viable. There remains, however, the uncertainty of performance because of inadvertent mainframe grounding during use or maintenance which may cause disk drive failure.

DISCLOSURE OF THE INVENTION

Improvement over prior art arrangements for preventing head to disk arcing such as discussed avove, is provided by this invention in a structural arrangement which electrically isolates the metallic actuator, the magnetic head and the disk or disk stack from the mainframe. In a preferred structural arrangement, representing the best mode for practicing the invention presently known to the applicants, this is accomplished by electrically isolating the metal actuator and the magnetic memory disks form the metallic main frame and bringing the metal actuator, the magnetic head on the metal actuator and the magnetic memory disk to the same or substantially the same voltage of the coil on the magnetic head which is different from the voltage or potential of the main frame. At the magnetic memory disk, or disk stack, this is accomplished by providing an opening in the main frame in which the end or base of the disk spindle is electrically insulatedly and mechanically secured. A stationary metal actuator support is also electrically insulated from the main frame, or alternatively is directed attached to the main frame and is electrically insulated from the metal actuator. In a rotart disk drive the base of the rotary actuarot spindle may be electrically insulatedly secured in an opening in the main frame, in the same manner as the disk spindle, and the metal actuatgor arm, or arm stack, being journalled on the actuator spindle, is therefore electrically insulated from the main frame. Alternatively, the actuator spindle may be directly secured to the main frame and a cylinder journalled on the actuator spindle provided with an insualting surface or other insulator to which the metal actuator is clamped or otherwise attached.

Where the metal actuator spindle and disk spindle are electrically insulated from the main frame, a thin electrical insulator or shim is employed. The thin electrical insulator has an annulus secured to the surface of the mainframe about the opening and has integral, inwardly projecting, radial segments, which are bent downwardly hy the spindle base upon installation of the spindle and positioned in spaced circumferential locations against and around the wall of the opening. At assembly, the base of the spindle is inserted into the opening where it engages the radial segments. The segments are deflected into the opening and separate the spindle base from teh mainframe. A flange on the spindle seats upon teh annulus about the opening and electrical insulating bonding material which is introduced into the cavity between the spindle base and the wall of the opening, bonds the spindle base to the wall between the segments. A cylindrical bearing housing is journalled by bearings on the spindle. The bearing housing on the disk spindle mounts the memory disk or a memory disk stack. The bearing housing on the actuator spindle mounts the actuator. Electrical circuits coupled to the magnetic head positioned at each disk couple electrical energy to and from the coil of the magnetic head for writing/reading. Electrical energy at the same, or substantially the same, electrical potential is also coupled to the memory disk or disk stack and the actuator. If the spindles are insulated from the mainframe, this electrical energy may be coupled to the spindles.

BEST MODE FOR CARRYING OUT THE INVENTION

Figure 1:
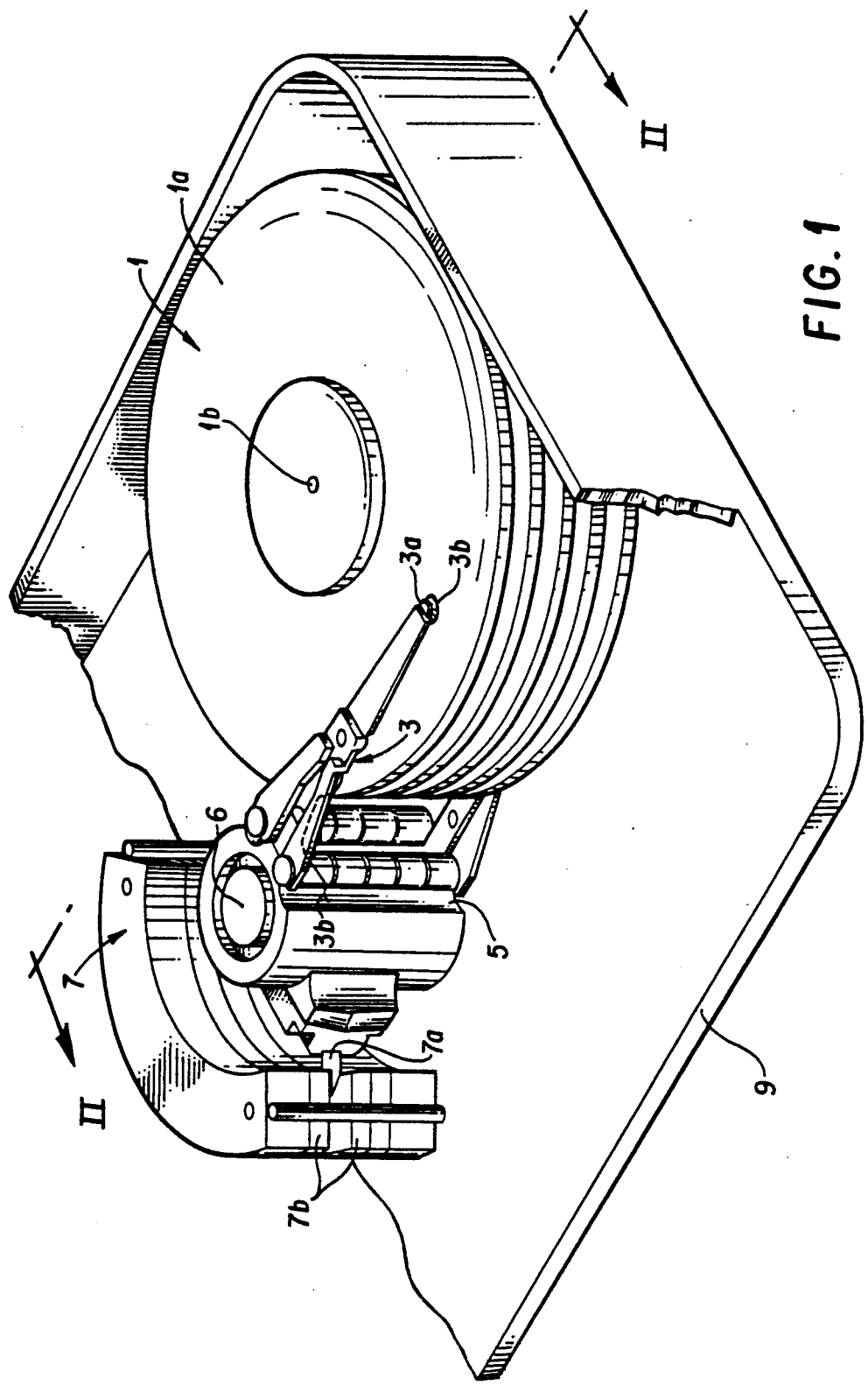
FIG. 1 illustrates a disk drive embodying essential features of this invention.

FIGS. 1 through 6 illustrate a presently preferred embodiment of this invention, representing the best mode for practicing this invention presently known to the applicants. The problem solved by this invention is centered in a disk memory drive of the type of FIG. 1 which illustrates a disk memory drive having a magnetic memory disk assembly or stack 1, comprising individual disks 1a. The disk assembly is rotatably mounted about an axis 1b of a disk spindle. The disk stack 1 is driven by a motor (not shown in this figure) and rotated at constant speed. A magnetic head 3a is flexibly mounted on the end of a rotary, magnetic head suspension and drive assembly called the actuator 2 herein, comprising an actuator arm 3, attached to a rotary actuator bearing housing 5, mounted for rotation on a spindle 6. The bearing housing 5 is connected to and driven by an electro-magnetic driver 7, having an armature 7a which swings between pole pieces 7b. The housing for the electro-magnetic drive 7 is not shown in this view. It appears in FIG. 2.

The disk stacks 1 and the actuator 2 are each rotatably mounted on a mainframe 9. Although a rotary drive is shown, the invention is equally applicable to linear or rotary drives. Electrical signals for writing and reading are coupled to and from each magnetic head by means of fine electrical wires 3b, only one of which is shown. Amplifier biasing voltages in the signal processing circuit for the magnetic head, see FIG. 6, may charge the parasitic capacitance of the magnetic head to a potential level sufficient to strike a head-to-disk arc. This inveniton provides improvements which obviate such a malfunction. Other structural features of this disk drive believed not to be essential to an understanding of this invention, are not illustrated in this figure in the interest of simplicity. Additional details of interest appear in FIGS. 2 through 6.

Figure 2:
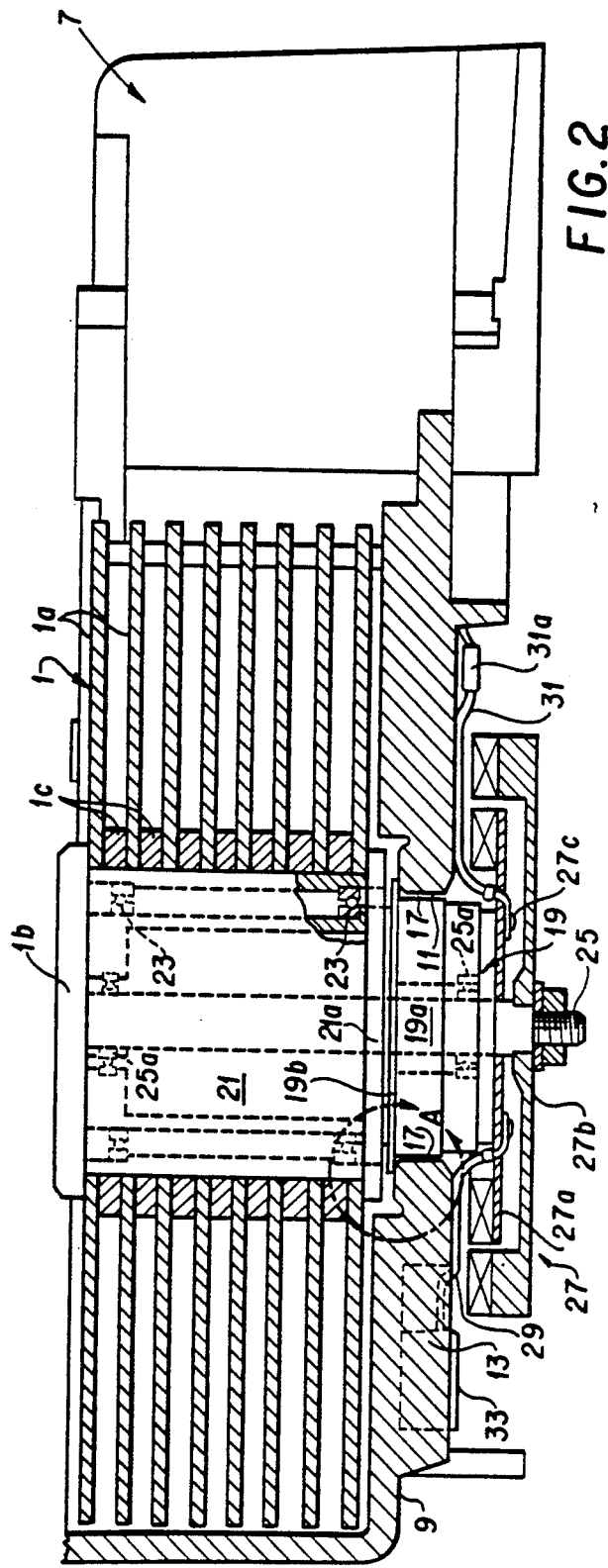
FIG. 2 is a cross-sectional view taken on the line II—II of FIG. 1, showing the electrically insulated disk assembly, embodying the principles of this invention.

FIG. 2 is a cross-sectional view taken on the line II—II of FIG. 1. It is essentially a cross section of the disk spindle assembly and the associated parts of the mainframe. In this figure, the housing of the electromagnetic drive 7 is shown installed, further details of the electromagnetic drive not being essential to an understanding of this invention.

The metallic mainframe 9 has a cylindrical opening 11 through its base 13. A cylindrical recess 15 is formed in the base 13 about the opening 11. An electrical insulator 17, the details of which appear in FIG. 3 and FIG. 4, and in an enlarged cross-sectional view in FIG. 5, has an annulus 17a adhesively secured to the surface of the cylindrical recess 15 about the circular opening 11, and segments 17b are disposed within the circular opening 11, in circumferentially spaced positions against the cylindrical wall of the opening 11. A spindle 19, having a cylindrical base 19a, is fitted through the opening 11 in contact with the surfaces of the segments 17b. Insertion of the cylindrical base 19a deflects the segments downwardly against the cylindrical wall to the positions shown in FIG. 2 and in FIG. 5. A flange 19b on the spindle 19, seats upon the upper face of the annulus 17a of the electrical insulator 17. The upper and lower faces of the annulus 17a are coated with an annular layer of a pressure-sensitive adhesive 17c, FIG. 3, having an inner diameter greater than the diameter of the flange 19a so that the flange 19b seats directly on the shim or insulator 17 inside the annular adhesive layers 17c so that there is no adhesive between the flange and the insulator or the insulator and the frame at the location of the flange 19b. The cavities defined between the segments 17b of the electrical insulator 17 and the confronting faces of the cylindrical base 19a of the spindle 19 and the cylindrical wall of the opening 11, is filled with an electrical insulating bonding agent, FIG. 5, such as an acrylic adhesive, securing the spindle in a fixed concentric position in the cylindrical opening 11, perpendicular to the base 13 of the mainframe 9.

The spindle 19 comprises an upper cylindrical support 19c, about which an inner barrel 21 of the disk stack 1 is journalled by bearings 23. The disks 1a of the disk stack 1 are clamped between annular spacers 23 in a stack between a lower flange 21a of the barrel 21 and a circular clamping plate 21b at the top of the barrel 21. A disk stack drive shaft 25 is journalled by bearings 25a in the spindle 19 and engages and is secured to the disk stack 1 at the clamping plate 21b to rotate the disk stack.

Figure 4:
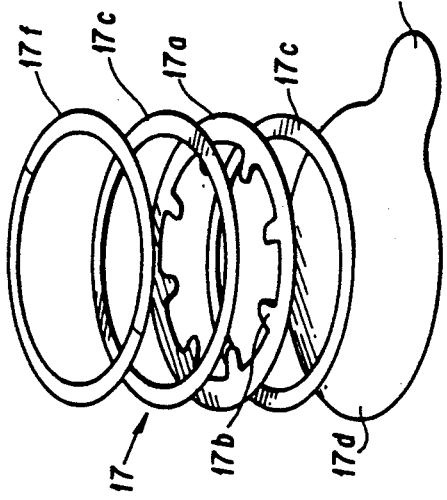
FIG. 4 is an exploded perspective view of the electrical insulator of FIG. 3.
Figure 3:
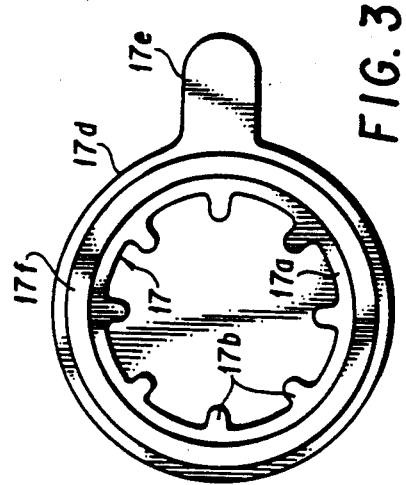
FIG. 3 is a plan view of an electrical insulator according to this invention.

As seen in FIG. 3 and FIG. 4, the electrical insulator 17 is a thin shim. It is preferably fabricated of a polyester or polycarbon type of material. The electrical insulator 17 is coated with an annular layer of pressure sensitive adhesive 17c on each surface of the annulus 17a. A thin, flexible cover plate 17d of circular platform, having a tab 17e for handling the insulator assembly, is attached to the adhesive layer 17c on one face of the annulus 17a and a ring 17f is attached to the adhesive layer 17c on the other face of the annulus 17a. The circular cover plate 17d and the ring 17f are of a material having a smooth or glossy surface, or which are otherwise constituted not to tightly bond to the pressure sensitive adhesive and are thereby very easily removed.

Figure 5:
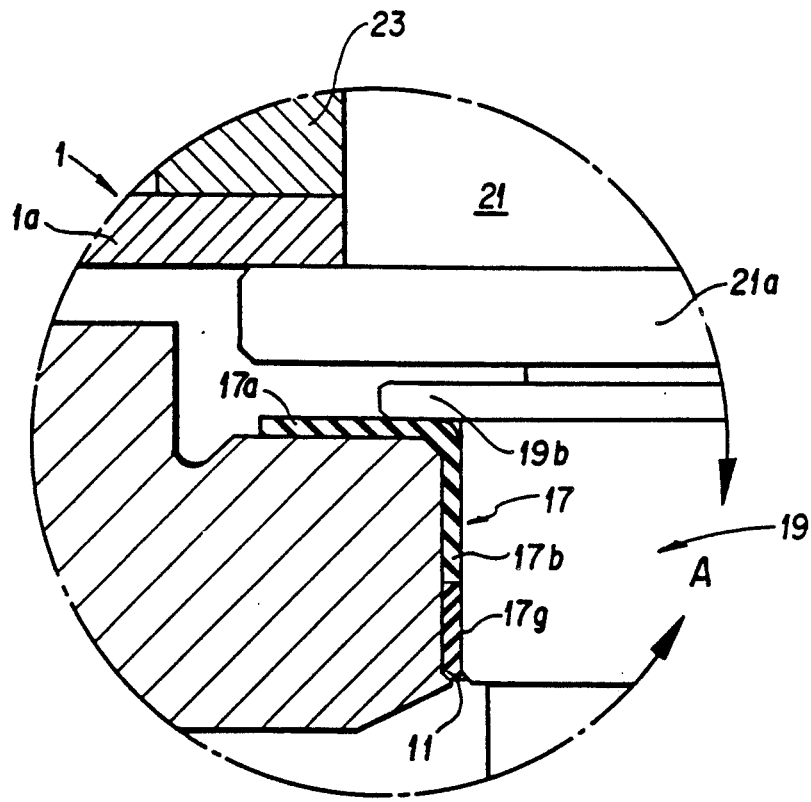
FIG. 5 is an enlarged sectional view illustrating a portion of the electrically isolated disk/spindle assembly.

The diameter of the circular cover plate 17d is slightly less than the diameter of the recess 15. To attach the spindle to the base 13, in electrical isolation from the mainframe 9, the electrical insulator 17 is installed in the recess 15 in the following manner. The ring 17f of the electrical insulator assembly is removed, exposing the annular adhesive layer 17c. The electrical insulator assembly is fitted into the recess 15 with the exposed annular adhesive layer 17c facing the bottom face of the recess 15 about the opening 11. The circular cover plate 17d fitting closely into the recess 15, concentrically indexes the annulus 17a of the electrical insulator 17 about the opening 11, and the pressure sensitive annular adhesive layer 17c secures the electrical insulator 17 in that position. The circular cover plate is now easily stripped from the annulus 17a, leaving the electrical insulator 17 in place with the radial segments 17b projecting radially inwardly in the plane of the insulator into the cylindrical opening 11. Insertion of the cylindrical base 19a of the spindle 19 into the opening 11, deflects the segments 17b downwardly against the wall of the opening 11 and the flange 19b of the spindle 19 seats directly upon the annulus 17a of the electrical insulator or shim 17 inside the annular adhesive layer 17c on the upper face of the annulus 17a. The mainframe and the spindle when so assembled are inverted. In inverted position, the flange 19b is securely positioned against the annulus 17a, in which position it is concentrically disposed in the opening 11 and its axis is perpendioular to the base 13 of the mainframe 9. In this inverted position, the acrylic adhesive 17g, FIG. 5, is introduced into the cavity defined between the spindle base 19a and the wall of the cylindrical opening 11. After curing, the acrylic adhesive secures the spindle 19 in the base 13 of the mainframe 9. The segments 17b of the electrical insulator 17 concentrically position and electrically insulate the spindle in the opening 11 and provides the intermediate cavities for the acrylic adhesive to directly bond the spindle 19 to the base 13 over the length of the cylindrical opening 11 to maximize the length of the longitudinal as well as the circumferential bond.

The disk stack 1 is rotated by a motor 27, having a stator 27a secured to the bottom end of the spindle 19 and a rotor 27b secured to the bottom end of the disk stack drive shaft 25. Screws 27c, which thread into the spindle 19 through its bottom face secure the motor stator 17a to the bottom face of the spindle 19 and also secure connectors on the ends of conductors 29 and 31 to the stator 27a, to provide electrical connections thereto. These electrical connections extend from the stator 27a to the spindle 19 to the bearings 23 to the inner barrel 21 of the disk stack and to the disk stack 1, including the individual disks 1a. A plug receptacle 23 is secured in a cavity in the bottom face of the base 13 of the mainframe. The conductor 29 is connected to a terminal in that plug to be supplied with a DC bias voltage, the same as that coupled to the magnetic heads 3a at each disk 1a, as will be discussed in connection with FIG. 6. The other conductor 31 is grounded through a capacitor 31a to provide an AC ground, but which is in an open circuit to the DC bias voltage. Thus the DC bias voltage is conducted from the plug 33, via conductor 29 to the stator 27a, to the spindle 19, to the bearings 23, to the inner barrel 21, and from there to the individual disks 1a.

The spindle 6 of the rotary actuator 2 may be similarly electrically insulated and installed to electrically isolate the bearing housing 5 from the mainframe 9. Thus the metal actuator 2, attached to the bearing housing 5, is electrically isolated from the main frame. Electrical potential coupled to the actuator spindle 6 is thereby coupled to the metal actuator 2 and to the body of the magnetic head 3a via the metal actuator 2.

By coupling the biasing potential for the preamplifier coupled to the coil of the magnetic head to the body of the magnetic head via the metal actuator connections and to the magnetic memory disk 1a via the disk spindle 19, these items are brought to the same potential level which is different from that of the main frame.

Figure 6:
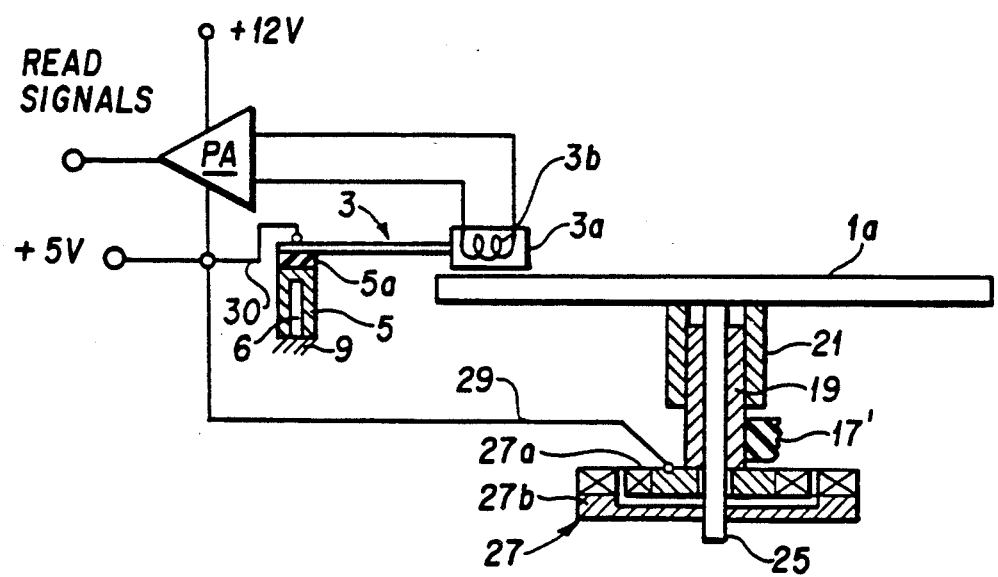
FIG. 6 schematically illustrates the organizational concept of this invention.

A schematic illustration of the circuit connections for the magnetic head 3a and disk 1a and metal actuator 2 appears in FIG. 6. Parts in this figure corresponding to those in other figures herein bear like reference characters. The disk 1a is secured to the inner barrel 21 which in turn is journalled on the spindle 19. The electrical insulator 17 is represented here by an insulating support 17', for the spindle 19. The motor stator 27a is secured to the bottom face of the spindle and the motor rotor 27b is secured to the disk spindle drive shaft 25 which is journalled in the spindle 19.

If the actuator spindle 6 were electrically insulatedly supported on the mainframe 9, the support structure would duplicate that of the disk spindle 19, and the circuit 30 would then be connected to the spindle 6. Instead the alternative embodiment described above is illustrated, in which the actuator spindle 6 is directly connected to the mainframe 9 and journals the bearing housing 6. The arm 3 of the actuator 2 is secured to an insulator 5a on the bearing housing 5. Conductor 30 couples electrical potential to the armstack 3.

A pre-amplifier PA is coupled in the signal circuit for the coil of the magnetic head 3a. The magnetic head 3a is disposed adjacent to the surface of the disk 1a on the end of the metal actuator 3, as though in flight. This amplifier PA is the first stage in the circuit for the processing of signals produced by the magnetic head, whether reading data or servo code. Such a magnetic head signal processing circuit is well known, and per se forms no part of this invention. The amplifier PA typically has a supply voltage input indicated as plus 12 volts and a bias voltage of plus 5 volts. It is the eleotrical potential resulting from this bias voltage that appears at the coil of the magnetic head that provides the charging current for the parasitic capacitance of the magnetic head, the charge potential of which is the cause of coil or head-to-disk arcing. The amplifier bias potential is now connected to the disks 1a via the stator 27a, the spindle 19 and the inner barrel 21. The inner barrel 21 carries the disks 1a and is journalled on the stationary electrically insulated spindle 19. The disks 1a are therefore also maintained at or near the amplifier bias voltage potential and electrically isolated from the main frame.

The body of the magnetic head is also at the amplifier bias potential since the conductor 30 couples the bias potential to the metal actuator 2, or to the armstack 3 to which the body of the magnetic head 3a is attached.

Although specific embodiments of this invention have been disclosed for achieving equal or substantially equal electrical potentials among the metal actuator 2, the magnetic head 3a and the disk 1a, other embodiments are readily apparent. Similarly, it is apparent that electrical insulators other than that of the disclosed configuration may be provided to support and electrically insulate or isolate the actuator spindle 6 and the disk spindle 19. Other biasing voltages may be employed and other paths than those chosen herein may be employed to couple the voltage to the magnetic heads and to the disks. For example, a slip ring and brush assembly on the shaft 25 may be employed, although with the attendant disadvantage of the introduction of extra parts.

INDUSTRIAL APPLICABILITY

This disk drive having electrically isolated actuator or arm stacks, or disk stacks in which the magnetic heads and the disk stack are maintained at the same or substantially the same electrical potential as the coil of the magnetic head to prevent arcing, is useful in computers and data processors.

What is claimed is:

1. A disk drive, comprising:
   a metal frame having a first electrical potential;

magnetic memory disk means having a magnetic memory disk rotatably mounted on said metal frame and electrically insulated therefrom;

metal actuator means movably mounted on said metal frame and electrically insulated therefrom;

a magnetic head mounted on said metal actuator means in a position over said magnetic memory disk;

said magnetic head having a coil; and circuit means for supplying, a second electrical potential to said coil, to said magnetic head, and to said magnetic memory disk, which potential is different from the potential of said metal frame.

2. A disk drive, comprising;

a metal frame having a first electrical potential;

a magnetic memory disk;

means for rotatably supporting said magnetic memory disk on said metal frame and electrically insulating said magnetic memory disk from said metal frame;

a magnetic head having a coil;

a metal actuator;

means mounting said magnetic head on said metal actuator in a position over said magnetic memory disk;

means for movable supporting said metal actuator on said metal frame and electrically insulating said metal actuator from said metal frame; and circuit means for supplying a second electrical potential to said magnetic head, to said magnetic memroy disk and to said coil which is different from the potential of said metal frame.

3. The disk drive according to claim 2, in which:

said means for rotatably supporting said magnetic memory disk comprises;

a metal spindle secured to said main frame;

a metal bearing housing rotatable on said spindle;

electrical insulating means on said metal bearing housing;

said actuator being secured to said electrical insulating means for electrically insulating said actuator from said metal bearing housing.

4. The disk drive according to claim 3, in which: said circuit means is conncted to said metal actuator.

5. The disk drive according to claim 2, in which: said circuit means is connected to said metal actuator.

6. The disk drive acording to claim 2, in which said means for rotatably supporting said magnetic memory disk comprises:

a metal spindle;

bearing measn rotatably mounting said magnetic memory disk on said spindle;

said metal frame having an opening therein;

an electrical insulator having spaced segments adjacent the wall of said opening;

an end of said spindle being disposed in said opening adjacent said segments, and means including an electrical insulating bonding material between said end of said spindle and said wall and between said segments for bonding said end of said spindle to said wall.

7. A disk drive, comprising a metal frame having a first electrical potential;

a metal spindle; means electrically insulatedly supporting said spindle on said metal frame;

at least oen memory disk rotatably mounted on said spindle;

a magnetic head having a coil;

actuator measn movably supporting said magnetic head adjacent a surface of said disk; and means for coupling electrical energy at a second electrical potential to said magnetic head, to said coil and to sadi disk, which potential is different from the potential of said metal frame.

8. A disk drive according to claim 7, in which said means for coupling electrical energy includes an electrical connection to said spindle.

9. a disk drive accoridng to claim 8, in which:

said electrical connection to said spindle comprises an electrical motor having a metal stator and a rotor;

means mounting said metal stator on said spindle in electrical contact with said spindle in a position so that said electricla motor does not touch said frame;

means for coupling electrical energy to said metal stator at substantially the same potential as said magnetic head, and;

means for coupling said rotor to said memory disk for rotating said memory disk.

10. A disk drive according to claim 9, in which:

said means for coupling said rotor to said memory disk comprises a disk drive shaft, journalled in said spindle, said disk drive shaft being connected to said memory disk, said rotor being connected to said disk drive shaft.

11. A disk drive according to claim 7, in which:

said metal frame has a base plate and a spindle receptacle having a peripheral wall in said base plate;

said electrical insulator means comprises individual insulator segments spaced about said peripheral wall of said receptacle;

a base on said spindle positioned in said receptacle and spaced from said peripheral wall by said individual segments; and an electrical insulating bonding material in the cavities between said segments bonding said base on said spindle to said wall.

12. A disk drive according to claim 11, in which:

said receptacle comprises a cylindrical opening through said base plate of said metal frame;

said electrical insulator means comprises an annulus secured about said cylindrical opening and having integral insulating segments in circumferentially spaced positions against the wall of said cylidnrical opening.

13. A disk drive accroding to claim 12, in which said annulus of electrical insulating material is adhesively secured about said opening.

14. A disk drive accroding to claim 10, in which:

said base of said spindle projects through said base palte and said stator of said motor is secured to the bottom face of said base of said spindle.

15. A disk drive accroding to claim 10, in which:

said spindle comprises a flange which is disposed on said annulus.

16. In a disk drive including a metal frame having a cylindrical openign therein, at least one memory disk, a magnetic head and actuator means for moving said magnetic head over said memory disk, means for rotatably mounting said memory disk on said metal frame in electrical isolation therefrom, comprising:

an electrical insulator having an annulus secured about said cylidnrical opening and having integral segments disposed in spaced adjacent positions against and around a wall of said cylindrical opening;

a spindle having an end poriton fitting in said opening against said segments; and an electrical insulating bonding material securing said end portion of said spindle to said wall between said segments.

* * * * *